June 16, 1931.  A. LIMPERT  1,810,429
INSTRUMENT FOR ALIGNING AUTOMOBILE WHEELS
Filed April 15, 1929
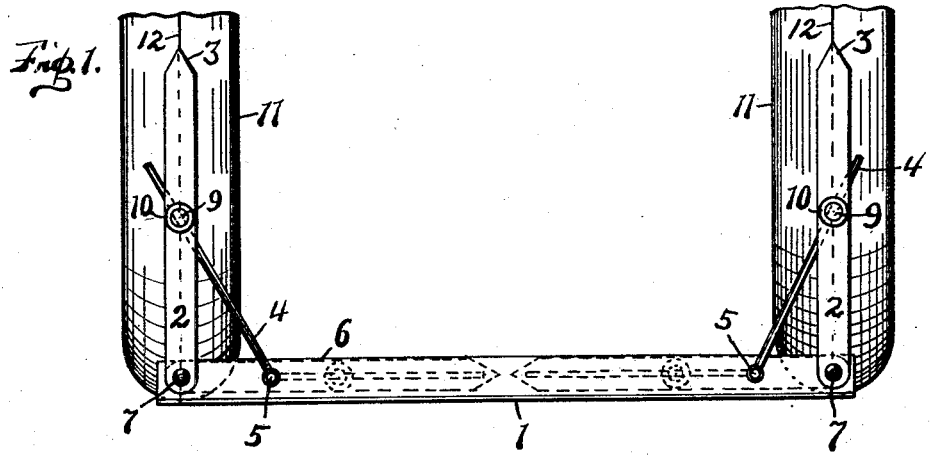
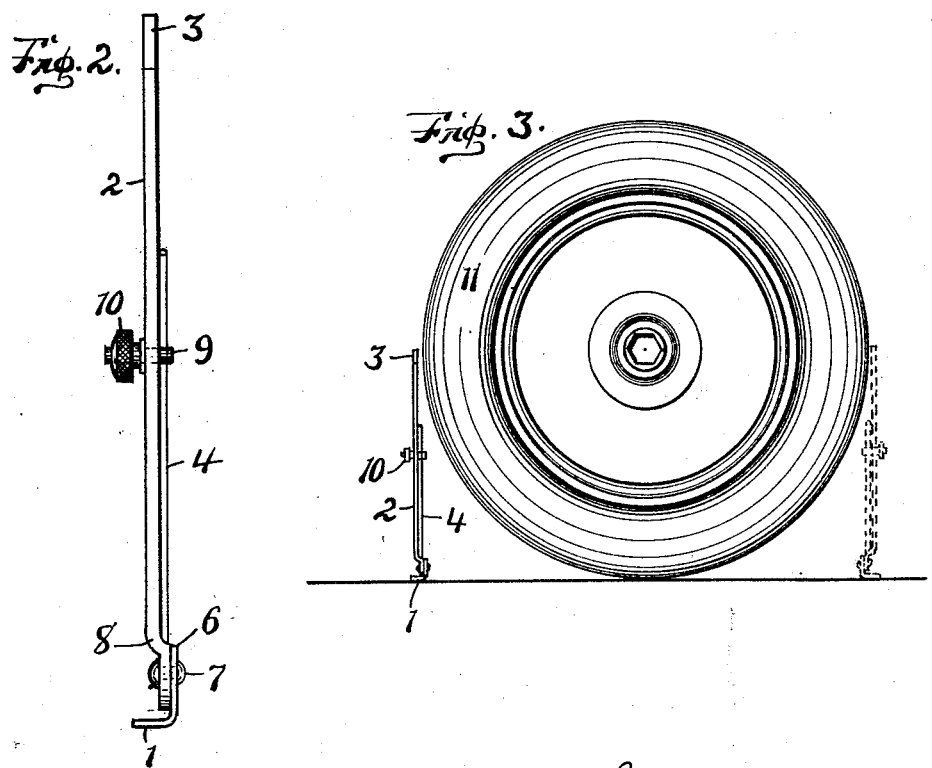
Archie Limpert INVENTOR.
BY
A. G. Burns ATTORNEY.

Patented June 16, 1931

1,810,429

UNITED STATES PATENT OFFICE

ARCHIE LIMPERT, OF HICKSVILLE, OHIO

INSTRUMENT FOR ALIGNING AUTOMOBILE WHEELS

Application filed April 15, 1929. Serial No. 355,051.

This invention relates to improvements in instruments for aligning automobile wheels, and the object thereof is to provide a device for use in determining the relative positions of automobile wheels with respect to parallelism of the opposite pairs to enable the operator to correctly adjust them. Another object is to construct the device in a manner that will permit of its being folded for disposal when not in use; and a further object is to afford a folding device of its kind so constructed as to admit of economic production and convenient use.

These objects are accomplished by the construction illustrated in the accompanying drawings, in which:—

Fig. 1 is a front elevation of the instrument applied to the front wheels of an automobile;

Fig. 2 is an end elevation of the instrument upon a larger scale than that of Fig. 1; and Fig. 3 is an end elevation of the instrument upon a reduced scale, in which its several positions in use are indicated when applied to the wheels of an automobile.

The invention is comprised of a base 1 consisting of an angle iron bar, at each end of which is pivoted an arm 2, the upper end of which is pointed to form an index 3.

A brace-rod 4 for each of said arms is provided, the rod being secured by a pivot 5 to the vertical flange 6 of the base 1 at a point spaced from the pivot 7 that secures the corresponding arm 2 to said flange. Each arm 2 has an offset 8 adjacent its pivoted end that extends backwardly from the flange so that the arm 2, rod 4 and flange 6 extend in separate vertical planes parallel to each other. Each arm has a stud 9 extending loosely therethrough, through one end of which the corresponding rod 4 loosely extends. The opposite end of the stud has a thumb-nut 10 threaded thereon, which, when tightened, draws the stud outwardly and clamps the rod and arm together so that relative movement between the base, the rod and the arm is prevented. The distance between the pivot 7, for the arm 2, and the stud 9, in said arm, is greater than the distance between the pivots 7 and 5, so that when the arm 2 is folded inwardly upon the base, the brace-rod 4 is likewise folded without interference between the stud 9 and pivot 5, as indicated in dotted outline in Fig. 1.

In utilizing the invention, the instrument is placed in front of one pair of the wheels 11 of an automobile, with the arms 2 adjusted in upright position with the points of the indexes in front of the centers of the wheels. By applying a jack (not shown) in the usual manner to the axle, the wheels are elevated so as to clear the ground and permit them to be freely revolved upon their spindles. A mark 12 is drawn upon the tread of each wheel in the center thereof which is readily accomplished by applying a lead pencil or other marker to the tread above the point of the indexes while spinning the wheel. The arms 2 are adjusted so that the points of their indexes register precisely with the corresponding marks made upon the treads of the wheels and are firmly secured by tightening the thumb-nuts 10. The instrument is then removed from in front of the wheels and repositioned back of the wheels as indicated in Fig. 3 by dotted outline. Alinement of the wheels, and their divergence or convergence are indicated by the relative positions of the index points of the two arms and the corresponding marked lines on the treads of the wheels. By thus applying the instrument the operator is enabled to readily and accurately adjust the wheels in the desired relative position.

The instrument as constructed admits of folding the arms on the base compactly back of the vertical flange, by which their points and the brace-rods are sheltered and thus protected from becoming damaged by meeting obstructions. Also, a feature of the invention is the simplicity of construction and the few parts of which it is formed which permits of its economical manufacture.

What I claim is:—

1. An instrument for aligning automobile wheels, comprising a base-bar; an arm pivoted at one end at each end of said base-bar, one end of each arm being pointed and constituting an index, there being an offset in each arm adjacent its pivoted end; a brace-rod for each arm having pivotal connection with said base-bar at a point spaced from the pivoted end of the corresponding arm; and a clamping means carried by each arm with which the corresponding brace-rod has sliding relation, said clamping means being spaced from the pivoted end of said arms a greater distance than that between the pivoted ends of the arm and rod, said arms and brace-rods having folding relation with respect to the base-bar.

2. An instrument for aligning automobile wheels comprising a base-bar; an index arm pivoted at one end thereof at each end of said base-bar and having folding relation therewith, each arm having an offset adjacent its pivoted end; a clamping means on each arm spaced from its pivoted end; and a brace-rod for each arm adjustably secured by said clamping means thereon and pivotally connected at one end with said bar and extending between said arm and the base-bar when the arm is folded.

3. In an instrument for aligning automobile wheels, a base comprising an angle iron bar; an index arm pivoted at one of its ends at each end of said bar to one flange thereof, each arm having an offset adjacent its pivoted end; a brace-rod for each arm pivoted at one of its ends to said flange at a point spaced from the pivoted end of the corresponding arm and extending in a plane between that of the flange and the adjacent face of the arm above said offset; a stud extending loosely in each arm through one end of which the corresponding brace-rod has sliding movement the distance between the arm pivot and stud being greater than that between the arm pivot and brace-rod pivot; and a nut threaded on the opposite end of each stud by which stud and nut the arm and brace-rod are clamped in adjusted positions.

In testimony whereof I affix my signature.

ARCHIE LIMPERT.